UNITED STATES PATENT OFFICE

2,206,610

OXAZINES OF THE ANTHRAQUINONE SERIES AND PROCESS OF PREPARING THEM

Georg Kränzlein, Ernst Diefenbach, and Fritz Eggert, Frankfort-on-the-Main-Hochst, Germany, assignors to General Aniline & Film Corporation, a corporation of Delaware No Drawing. Application June 22, 1937, Serial No. 149,790. In Germany June 27, 1936

11 Claims. (Cl. 260—244)

The present invention relates to oxazines of the anthraquinone series and to a process of preparing them.

We have found that oxazines of the anthraquinone series are obtainable by causing an anthraquinone compound which contains in its 1-position a halogen atom and in its 2-position a sulfonic acid group and which may contain in the anthraquinone nucleus further substituents, radicals or atom groups, to react, in the presence of an acid binding agent and advantageously in the presence of copper or a copper compound, with an aromatic compound, for instance, of the benzene-, naphthalene- and anthraquinone series containing an amino group and a hydroxyl group in ortho-positions to each other, for instance, by heating the reaction components at a temperature between room temperature and about 100° C., and, if desired, sulfonating the products thus obtained.

The course of reaction may be illustrated, for instance, by the following scheme:

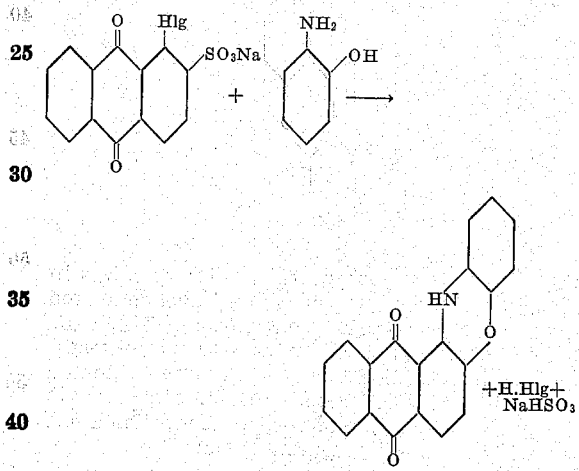

In view of the hitherto known processes of making oxazines of the anthraquinone series it is surprising that, according to the present invention, the said substances are easily formed by a smooth reaction in an aqueous or alcoholic medium and at low temperatures of reaction.

Since the anthraquinone- and amino-components used may be largely varied, a very great number of hitherto inaccessible valuable dyestuffs and intermediate products for dyestuffs can be prepared by the process of this invention.

The following examples serve to illustrate the invention, but they are not intended to limit it thereto, the parts being by weight: the parts by weight and by volume have the same relationship to each other as the kilo has to the liter.

(1) 22.5 parts of the potassium salt of 1-iodo-anthraquinone-2-sulfonic acid, 15 parts of calcined sodium carbonate and 1 part of cuprous chloride are stirred at 50° C. to 55° C. together with a solution of 13 parts of ortho-aminophenol in 300 parts of water and 15 parts by volume of caustic soda solution of 40° Bé. in a nitrogen atmosphere until the amount of the anthraquinone-2.1-oxazine which separates in the form of small violet crystals no longer increases. The product is filtered with suction and purified by extracting it with a hot solution of hydrochloric acid. By recrystallization from benzene the product is obtained in the form of long blue needles which dissolve in concentrated sulfuric acid to a blue green and in organic solvents to a violet solution.

By sulfonation, for instance, with fuming sulfuric acid containing 8 per cent. of sulfuric anhydride at 20° C. to 25° C. for about 2 hours, a sulfonic acid is obtained which dyes wool clear blue-violet tints.

(2) 45 parts of the potassium salt of 1-iodo-anthraquinone-2-sulfonic acid, 34 parts of sodium 2-hydroxy-3-amino-5-sulfobenzoate, 10 parts of calcined sodium carbonate, 10 parts of caustic soda solution of 40° Bé., 2 parts of cuprous chloride and 500 parts of water are heated together for 2 hours at 40° C. to 45° C., while stirring. The temperature is then raised to 80° C. to 90° C. for another 2 to 3 hours whereupon the mixture is introduced, while stirring, into a hot sodium chloride solution of 10 per cent. strength. The condensation product is precipitated by means of dilute hydrochloric acid. The dyestuff thus obtained has the following constitution:

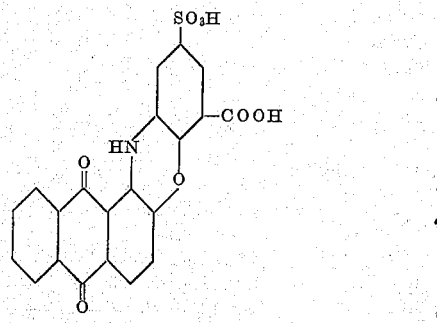

It dyes wool in an acid bath violet-blue tints.

(3) 23 parts of potassium 1-iodo-anthraquinone-2-sulfonate, 40 parts of a paste of 45.5 per cent. strength of 3.5.6-trichloro-2-aminophenol-4-sulfonic acid, 16 parts of calcined sodium carbonate, 10 parts of sodium bicarbonate, 1.5 parts of cuprous chloride and 200 parts of water are stirred at 40° C. until the crystalline precipitate of the anthraquinone-2.1-oxazine-trichloro-sulfonic acid of the formula:

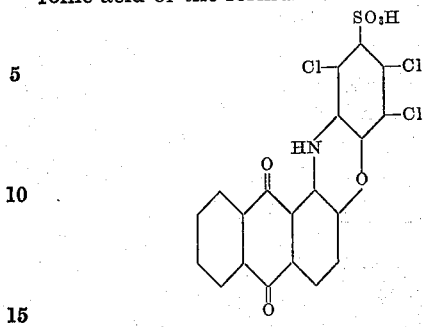

no longer increases.

The crystalline precipitate is filtered with suction and washed with a sodium chloride solution of 3 per cent. strength. The residue remaining on the filter is then extracted several times with hot dilute hydrochloric acid and dried. The dyestuff is a dark red-violet crystalline powder. It dyes wool bluish red tints.

(4) 23 parts of the potassium salt of 1-iodo-anthraquinone-2-sulfonic acid, 19 parts of 3.4.5.6-tetrachloro-2-aminophenol of 95 per cent. strength, 15 parts of calcined sodium carbonate, 15 parts of sodium bicarbonate and 1 part of cuprous chloride are stirred together at 40° C. to 50° C. for 3 hours in 400 parts of water. The mixture is then introduced into about 4000 parts of hot water, filtered with suction and subsequently washed with hot water. For further purification the anthraquinone-tetrachloroxazine is extracted with boiling dilute hydrochloric acid, washed until neutral, dried and recrystallized from about 1000 parts by volume of nitrobenzene. Long dark violet-brown brilliant needles are obtained which dissolve in concentrated sulfuric acid to a green solution and dye cotton in a brown-red vat bluish red tints.

(5) 45 parts of the potassium salt of 1-iodo-anthraquinone-2-sulfonic acid, 38 parts of 6-chloro-2-aminophenol-4-sulfonic acid, 30 parts of calcined sodium carbonate, 30 parts of sodium bicarbonate, 2 parts of cuprous chloride and 400 parts of water are stirred together for 3 hours at 50° C. to 60° C. After cooling, the whole is filtered with suction and the residue is washed on the filter with a sodium chloride solution of 5 per cent. strength. The filter cake is then dissolved in about 6000 parts of hot water and filtered while hot. The condensation product formed is precipitated from the filtrate by addition of hydrochloric acid and a small amount of a saturated sodium chloride solution; it is further purified by dissolving it in pyridine water of 10 per cent. strength and precipitating it with hydrochloric acid.

In this manner small needles with a metallic luster are obtained which dye wool from an acid bath reddish violet tints.

(6) A product very similar to that described in Example (5) is obtained by using the same amount of 4-chloro-2-aminophenol-6-sulfonic acid.

(7) 22.5 parts of the potassium salt of 1-iodo-anthraquinone-2-sulfonic acid, 15 parts of 3-amino-4-hydroxy-1-methylbenzene-5-sulfonic acid, 15 parts of calcined sodium carbonate, 15 parts of sodium bicarbonate, 1 part of cuprous chloride and 300 parts of water are stirred together for 10 hours at 50° C. to 60° C. After cooling, the anthraquinone-oxazine-methyl-sulfonic acid which has separated is filtered and washed with a sodium chloride solution of 5 per cent. strength. The product is then washed with hydrochloric acid of 3 per cent. strength, filtered with suction, and the dyestuff is dissolved in very dilute hydrochloric acid. From the clarified solution the dyestuff is isolated by addition of concentrated hydrochloric acid and subsequent heating. A blue powder is thus obtained which is soluble in water to a blue-violet solution and dyes wool in an acid bath violet tints.

(8) 22.5 parts of the potassium salt of 1-iodo-anthraquinone-2-sulfonic acid, 27 parts of 2-amino-4-acetaminophenol-6-sulfonic acid, 16 parts of calcined sodium carbonate, 15 parts of sodium bicarbonate, 1 part of cuprous chloride and 350 parts of water are heated for some hours, for instance 3 hours, at 60° C. to 65° C., until the formation of the dyestuff is complete. The condensation product is isolated and purified in the usual manner; the anthraquinone-oxazine-acetamino-sulfonic acid thus obtained dyes wool violet tints.

(9) 22.5 parts of the potassium salt of 1-iodo-anthraquinone-2-sulfonic acid, 27 parts of 3-amino-4-hydroxy-benzophenone-2'-carboxylic acid, 10 parts of sodium bicarbonate, 25 parts of caustic soda solution of 35 per cent. strength, 1 part of cuprous chloride and 350 parts of water are heated at 60° C. to 65° C. until the formation of oxazine is complete. The product is worked up in the usual manner. The oxazine obtained has the following constitution:

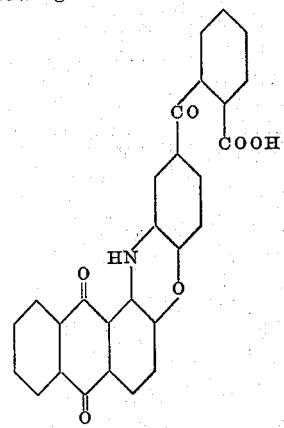

The product is a blue powder which dissolves in dilute alkali to a blue-violet and in concentrated sulfuric acid to a dark green solution. When the compound is introduced into five times its weight of sulfuric acid of 96 per cent. strength, heated to 90° C. to 100° C., there is formed after a short time, with elimination of water, a body which has one of the following constitutions:

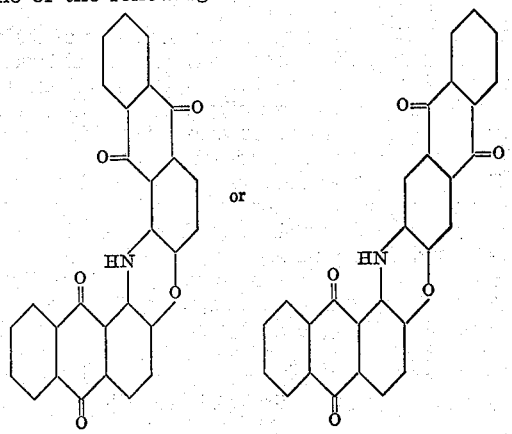

or is a mixture of bodies having these constitutions, respectively.

The product dissolves in concentrated sulfuric acid to a pure green solution and dyes cotton in a brown-red vat violet tints.

A similar dyestuff is obtained by condensing the potassium salt of 1-bromo- or 1-iodo-anthraquinone-2-sulfonic acid with 1-amino-2-hydroxyanthraquinone.

(10) 23 parts of the potassium salt of 1-iodo-4-phenylaminoanthraquinone-2-sulfonic acid, 18 parts of 3.4.5.6-tetrachloro-2-aminophenol, 15 parts of calcined sodium carbonate, 15 parts of sodium bicarbonate, 2 parts of cuprous chloride and 500 parts of water are stirred together at 40° C. to 50° C., until the condensation is complete. The condensation product thus formed is filtered with suction while still warm and the residue remaining on the filter is again extracted by means of hot dilute hydrochloric acid. For further purification the product is made into a vat and the vat is oxidized with air. A dark powder is thus obtained which dissolves in concentrated sulfuric acid to a blue solution. When the sulfuric acid solution is poured into water the substance is precipitated in the form of green flakes.

(11) 12 parts of the potassium salt of 1-iodo-anthraquinone-2.6-disulfonic acid, 7 parts of 5-amino-2.4-dihydroxybenzoic acid, 10 parts of calcined sodium carbonate and 0.5 part of cuprous chloride are stirred together in 100 parts of water for 20 hours at 35° C. to 40° C. in an atmosphere of nitrogen. The product is isolated and purified in the usual manner; the oxazine obtained has the following constitution:

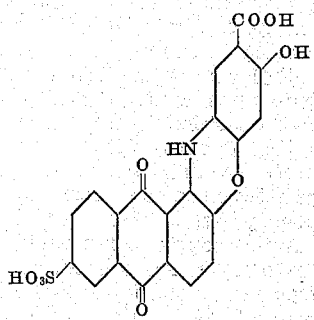

The body dissolves in concentrated sulfuric acid, to a green and in water to a blue solution. It dyes wool in an acid bath blue tints which turn green on afterchroming.

(12) By condensing sodium 1-bromanthraquinone-2-sulfonate in the above-described manner with sodium 2-amino-4-nitrophenol-6-sulfonate, there is obtained after isolation and purification in the described manner the oxazine of the following constitution:

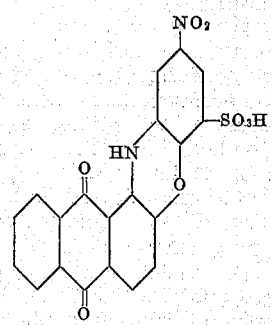

It dyes wool reddish violet tints.

By using the isomeric 2-amino-6-nitrophenol-4-sulfonic acid, there is obtained a product of very similar tinctorial properties.

(13) By causing potassium 1-iodo-anthraquinone-2-sulfonate to react with sodium 3-amino-4-hydroxydiphenyl-sulfone- 3' - sulfonate the oxazine of the formula:

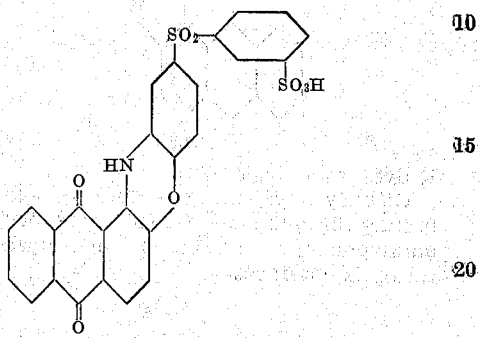

is obtained which dyes wool reddish violet tints.

(14) By condensing potassium 1-iodo-anthraquinone-2-sulfonate with sodium 1-hydroxy-2-aminonaphthalene-4-sulfonate there is obtained the oxazine of the following formula:

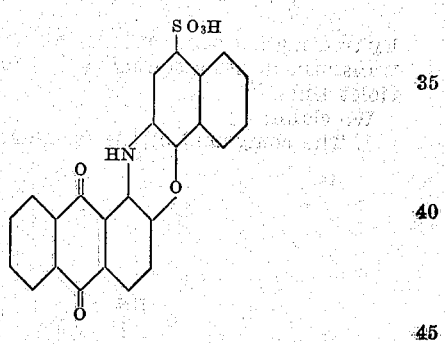

It dyes wool blue-grey tints.

(15) By causing sodium-1-bromanthraquinone-2.4-disulfonate to react in the manner indicated in the foregoing examples with 2-amino-4-acetaminophenol a product of the following formula is obtained:

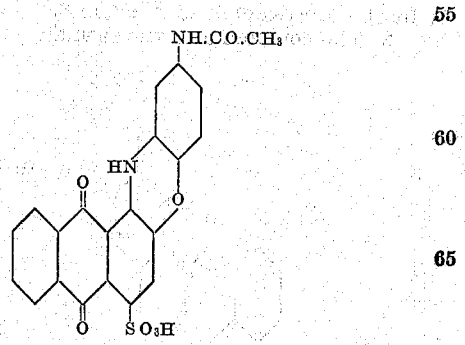

which dyes wool violet tints.

(16) By causing sodium-1-iodo-4-bromanthraquinone-2-sulfonate to react at a temperature between 25° C. and 35° C. with sodium-2-amino-4-acetaminophenol-6-sulfonate, only the iodine atom is exchanged and a body of the following constitution is obtained:

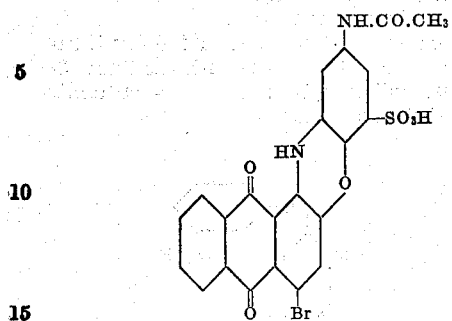

It dyes wool violet tints.

(17) By condensing sodium - 1 - amino - 4 - bromanthraquinone - 3 - sulfonate with ortho-aminophenol an oxazine of the following constitution is obtained:

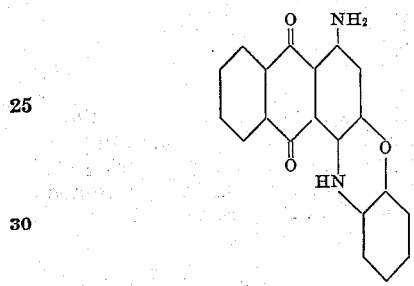

By treating it with a sulfonating agent it may be transformed into a sulfonic acid which dyes wool violet tints.

We claim:
1. The compound of the formula:

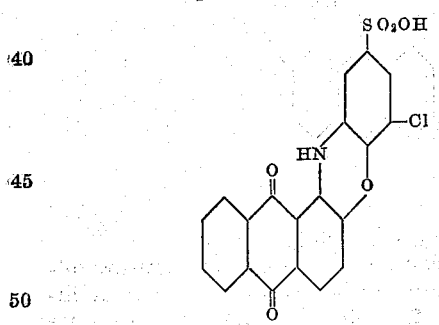

forming needles having a metallic lustre and dyeing wool from an acid bath reddish violet tints said compound being identical with that obtained by the process defined in claim 8.

2. The compound of the formula:

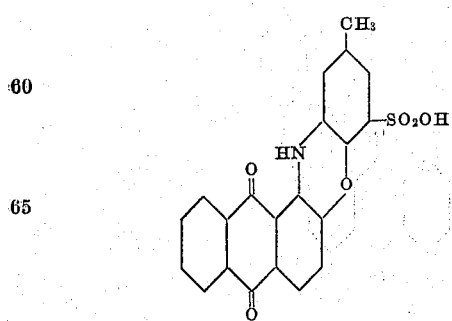

being a blue powder which dissolves in water to a blue-violet solution and dyes wool from an acid bath violet tints said compound being identical with that obtained by the process defined in claim 9.

3. The compound of the formula:

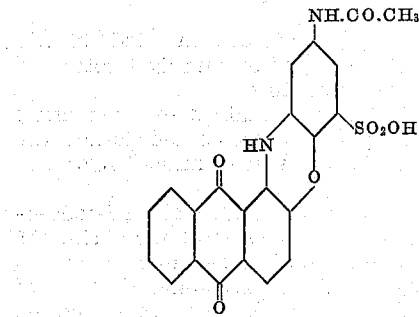

dyeing wool violet tints said compound being identical with that obtained by the process defined in claim 10.

4. The process which comprises heating at a temperature between room temperature and about 100° C. in the presence of water, an acid binding agent and a catalyst of the group consisting of copper and copper compounds an anthraquinone compound which contains in its 1-position a halogen atom and in its 2-position a sulfonic acid group together with a compound of the group consisting of amino phenyl compounds, aminonaphthyl compounds and aminoanthraquinone compounds which contains a hydroxy group in ortho position to its amino group.

5. The process which comprises heating at a temperature between room temperature and about 100° C. in the presence of water, an acid binding agent and a catalyst of the group consisting of copper and copper compounds an anthraquinone compound which contains in its 1-position a halogen atom and in its 2-position a sulfonic acid group together with a compound of the group consisting of amino phenyl compounds, amino naphthyl compounds and amino anthraquinone compounds which contains a hydroxy group in ortho position to its amino group and sulfonating the products thus obtained.

6. The process which comprises heating at a temperature between room temperature and about 100° C. in the presence of water, an acid binding agent and a copper compound an anthraquinone compound which contains in its 1-position a halogen atom and in its 2-position a sulfonic acid group together with a compound of the group consisting of amino phenyl compounds, amino naphthyl compounds and amino anthraquinone compounds which contains a hydroxy group in ortho position to its amino group.

7. The process which comprises heating at a temperature between room temperature and about 100° C. in the presence of water, an acid binding agent and a copper compound an anthraquinone compound which contains in its 1-position a halogen atom and in its 2-position a sulfonic acid group together with a compound of the group consisting of amino phenyl compounds, amino naphthyl compounds and amino anthraquinone compounds which contains a hydroxy group in ortho position to its amino group and sulfonating the products thus obtained.

8. The process which comprises heating at about 50° C. to about 60° C. for about 3 hours in the presence of sodium carbonate, sodium bicarbonate, cuprous chloride and water potassium-1-iodo-anthraquinone-2-sulfonate together with 6-chloro-2-aminophenol-4-sulfonic acid.

9. The process which comprises heating at about 50° C. to about 60° C. for about 10 hours in the presence of sodium carbonate, sodium bicarbonate, cuprous chloride and water potassium-1-iodo-anthraquinone-2-sulfonate together with 3-amino-4-hydroxy-1-methyl-benzene-5-sulfonic acid.

10. The process which comprises heating at about 60° C. to about 65° C. for some hours in the presence of sodium carbonate, sodium bicarbonate, cuprous chloride and water potassium-1-iodo-anthraquinone-2-sulfonate together with 2-amino-4-acetaminophenol-6-sulfonic acid.

11. The compounds of the general formula:

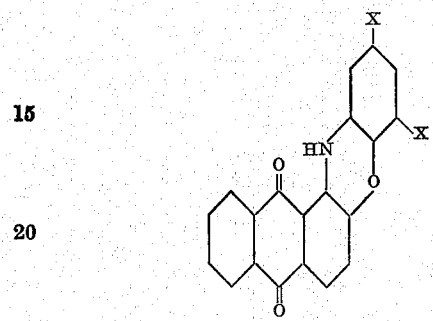

wherein one X represents a sulfonic acid group and the other X a substituent of the group consisting of chlorine, methyl and acetyl amino, said compounds being identical with those obtained by the process which comprises heating at a temperature between room temperature and about 100° in the presence of water, an acid binding agent, and a catalyst of the group consisting of copper and copper compounds, an anthraquinone compound which contains a halogen atom in the 1-position and a sulfonic acid group in the 2-position together with a compound having the formula

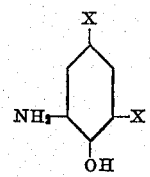

wherein one X represents a sulfonic acid group and the other X a substituent of the group consisting of chlorine, methyl and acetylamino.

GEORG KRÄNZLEIN.
ERNST DIEFENBACH.
FRITZ EGGERT.